(12) United States Patent
Ma et al.

(10) Patent No.: US 8,969,235 B2
(45) Date of Patent: Mar. 3, 2015

(54) WC/CNT, WC/CNT/PT COMPOSITE MATERIAL AND PREPARATION PROCESS THEREFOR AND USE THEREOF

(71) Applicants: Zhejiang University of Technology, Hangzhou, Zhejiang (CN); Queen's University Belfast, Belfast, Northern Ireland (GB)

(72) Inventors: Chun-An Ma, Zhejiang (CN); Zhao-Yang Chen, Zhejiang (CN); Wen-Feng Lin, Belfast (GB); You-Qun Chu, Zhejiang (CN)

(73) Assignees: Zhejiang University of Technology, Zhejiang (CN); Queen's University Belfast, Belfast (IE)

( * ) Notice: Subject to any disclaimer, the term of this patent is extended or adjusted under 35 U.S.C. 154(b) by 0 days.

(21) Appl. No.: 14/130,171

(22) PCT Filed: Dec. 14, 2012

(86) PCT No.: PCT/CN2012/086627
§ 371 (c)(1),
(2) Date: Dec. 30, 2013

(87) PCT Pub. No.: WO2013/143326
PCT Pub. Date: Oct. 3, 2013

(65) Prior Publication Data
US 2015/0018199 A1    Jan. 15, 2015

(30) Foreign Application Priority Data

Mar. 31, 2012   (CN) .......................... 2012 1 0093269

(51) Int. Cl.
*B01J 27/22*      (2006.01)
*B01J 23/42*      (2006.01)
(Continued)

(52) U.S. Cl.
CPC . *C25B 3/04* (2013.01); *B01J 27/22* (2013.01); *B01J 21/185* (2013.01); *B01J 23/42* (2013.01);
(Continued)

(58) Field of Classification Search
CPC .......... B01J 21/185; B01J 23/30; B01J 23/42; B01J 27/22
USPC .......................................... 502/177, 313, 339
See application file for complete search history.

(56) References Cited

FOREIGN PATENT DOCUMENTS

| CN | 1628903 | 6/2005 |
|---|---|---|
| CN | 1994560 | 7/2007 |
| CN | 101138733 | 3/2008 |
| CN | 102069002 | 5/2011 |

OTHER PUBLICATIONS

Ma, et al., "Template-free environmentally friendly synthesis and characterization of unsupported tungsten carbide with a controllable porous framework," Microporous and Mesoporous Materials 149, pp. 76-85, Aug. 2011.*

(Continued)

*Primary Examiner* — Melvin C Mayes
*Assistant Examiner* — James Corno
(74) *Attorney, Agent, or Firm* — Greenberg Traurig, LLP; Fang Xie (57) ABSTRACT

Disclosed are WC/CNT, WC/CNT/Pt composite material and preparation process therefor and use thereof. The WC/CNT/Pt composite material comprises mesoporous spherical tungsten carbide with diameter of 1-5 microns, carbon nanotubes and platinum nanoparticles, with the carbon nanotubes growing on the surface of the mesoporous spherical tungsten carbide and expanding outward, and the platinum nanoparticles growing on the surfaces of the mesoporous spherical tungsten carbide and carbon nanotubes. The WC/CNT composite material comprises mesoporous spherical tungsten carbide with diameter of 1-5 microns, and carbon nanotubes growing on the surface of the mesoporous spherical tungsten carbide and expanding outward. The WC/CNT/Pt composite material can be used as an electro-catalyst in a methanol flue battery, significantly improving the catalytic conversion rate and the service life of the catalyst. The WC/CNT composite material can be used as an electro-catalyst in the electro-reduction of a nitro aromatic compound, significantly improving the efficiency of organic electro-synthesis.

14 Claims, 4 Drawing Sheets

(51) Int. Cl.
  *C25B 3/04* (2006.01)
  *B01J 21/18* (2006.01)
  *B01J 37/00* (2006.01)
  *B01J 37/08* (2006.01)
  *B01J 37/30* (2006.01)
  *H01M 4/92* (2006.01)
  *H01M 4/86* (2006.01)
  *C25B 11/04* (2006.01)

(52) U.S. Cl.
  CPC ............ *B01J 37/0072* (2013.01); *B01J 37/084* (2013.01); *B01J 37/30* (2013.01); *H01M 4/92* (2013.01); *H01M 4/8663* (2013.01); *H01M 4/8647* (2013.01); *C25B 11/0478* (2013.01)
  USPC ......................................................... 502/177

(56) References Cited

OTHER PUBLICATIONS

Levy and Boudard, "Platinum-Like Behavior of Tungsten Carbide in Surface Catalysis," Science. 181(4099) 547-549, (1973).

Liang et al., "Nanostructured Nanostructured WCx/CNTs as highly efficient support of electrocatalysts with low Pt loading for oxygen reduction reaction", Energy and Environmental Science. 3(8): 1121-1127 (2010).

Ma et al., "Template-free environmentally friendly synthesis and characterization of unsupported tungsten carbide with a controllable porous framework," Microporous and Mesoporous Materials. 149(1): 76-85 (2012).

International Search Report in International Application No. PCT/CN2012/086627 mailed Mar. 28, 2013.

* cited by examiner

Electric Potential/V (vs. SCE)

Fig. 8

WC/CNT, WC/CNT/PT COMPOSITE MATERIAL AND PREPARATION PROCESS THEREFOR AND USE THEREOF

TECHNICAL FIELD

The invention relates to a tungsten carbide/carbon nanotube/platinum (WC/CNT/Pt) ternary composite material, a tungsten carbide/carbon nanotube (WC/CNT) composite material and preparation methods thereof, and their uses in such important fields as fuel cell, electrosynthesis, etc.

BACKGROUND ART

As a catalyst used widely in such important fields as fuel cell, electrosynthesis, etc., platinum (Pt) has attracted interest for a long time. Nanonization of Pt catalysts is a major direction of research, and has been under intensive study in the past twenty years. However, just like other catalysts, particles resulting from nanonization suffer from many problems such as coagulation, poor stability, etc. A key point to develop this series of catalysts is further enhancement of the performance, utilization efficiency and service life of Pt catalysts.

Tungsten carbide (WC) is a non-noble metal catalytic material having good performance, and its potential use as a catalyst has been paid close attention to since it was reported to have good catalytic activity for dehydrogenation of cyclohexane and dehydrogenation of ethyl benzene to styrene in 1960s. It was reported by literature (see literature: Science, 1973, 181: 547) that the surface electron layer of WC was similar to that of Pt, and showed catalytic activity similar to that of Pt in some reactions. WC has not only characteristics that enable it to replace noble metal catalysts such as Pt, etc. and good anti-poisoning ability, but also strong acid resistance and good electrocatalytic activity. However, due to the high temperature steps in preparation of WC and its relatively high specific gravity, its increase of specific surface area is limited, and thus increase of porosity and inhibition of particle coagulation are the main feasible directions of research (see literature: Microporous and Mesoporous Materials 2012, 149: 76). Hence, preparation of a WC-Pt composite material with well-dispersed tungsten carbide having mesoporous structure as the main component of the catalyst can not only reduce the amount of Pt used and thus lower the cost of the catalyst, but also increase the stability of the composite material and prolong the service life. Further, since carbon nanotube (CNT) has long been regarded as a good material for matrix, and has excellent mechanical, electronic, thermodynamic and other characteristics, its incorporation into a composite sample can increase porosity, specific surface area, electric conductivity and inhibit particle coagulation effectively. Existing Pt/WC, Pt/CNT, WC/CNT catalysts are mainly supported catalysts, and the preparation of the composite materials is fulfilled by supporting binary component particles on a matrix(WC, CNT, or WC/CNT). Moreover, the support of Pt is mostly accomplished by gas phase reduction or chemical reduction, wherein the process is relatively complex, causing difficulty in control over cost and process standardization, such that large scale preparation is difficult. Therefore, in order to improve the catalytic activity and stability of nano Pt remarkably, the key and critical approach is preparation under controllable conditions of a composite catalyst characterized by good Pt dispersity and developed porosity of WC or CNT matrix. Furthermore, if some components can be prepared concurrently to reduce preparation steps, production time, energy consumption and production cost originating therefrom may be further reduced greatly.

Up to now, there has never been any report on the preparation of spherical WC/CNT/Pt composite material and WC/CNT composite material by simultaneous process.

SUMMARY OF THE INVENTION

The first object of the invention is to provide a tungsten carbide/carbon nanotube/platinum (WC/CNT/Pt) composite material which has stable bonding between components, high catalytic activity, good thermal stability and strong anti-poisoning ability.

The second object of the invention is to provide a method for preparing a tungsten carbide/carbon nanotube/platinum (WC/CNT/Pt) composite material, wherein CNT is generated concurrently with the step of generating spherical WC by carbonization and grows on WC spheres, Pt particles are obtained by displacement of Fe particles, load of platinum is controllable, and the preparation procedure is simple at low cost on the whole.

The third object of the invention is to provide a use of the tungsten carbide/carbon nanotube/platinum (WC/CNT/Pt) composite material as an electrocatalyst in a methanol fuel cell.

The forth object of the invention is to provide a tungsten carbide/carbon nanotube (WC/CNT) composite material which has stable bonding between WC and CNT, high catalytic activity, good thermal stability and strong anti-poisoning ability.

The fifth object of the invention is to provide a method for preparing a tungsten carbide/carbon nanotube (WC/CNT) composite material, wherein CNT is generated concurrently with the step of generating spherical WC by carbonization and grows on WC spheres, the preparation procedure is simple at low cost, and the bonding between components is stable.

The sixth object of the invention is to provide a use of the WC/CNT composite material as an electrocatalyst in the electro-reduction reaction of aromatic nitro compounds.

The technical solutions of the invention will be illustrated specifically.

The invention provides a tungsten carbide/carbon nanotube/platinum (WC/CNT/Pt) composite material which comprises mesoporous spherical tungsten carbide of 1-5 microns in diameter, carbon nanotubes and platinum nanoparticles, wherein the carbon nanotubes grow on the surface of the mesoporous spherical tungsten carbide and extend outwardly therefrom, and the platinum nanoparticles grow on the surfaces of the mesoporous spherical tungsten carbide and the carbon nanotubes.

Further, nanoparticles of tungsten carbide may also grow on the surfaces of the carbon nanotubes of the tungsten carbide/carbon nanotube/platinum composite catalyst.

The invention also provides a method for preparing the tungsten carbide/carbon nanotube/platinum composite catalyst, comprising the following steps:

(1) pelletizing a solution of a mixture of ammonium metatungstate and ferric nitrate by spray drying; carbonizing the resulting particles by temperature programmed gas-solid reaction process directly or after calcination to obtain a tungsten carbide/carbon nanotube/iron (WC/CNT/Fe) composite material after completion of the carbonization;

(2) putting the tungsten carbide/carbon nanotube/iron composite material into a solution of a platinum containing compound to carry out platinum displacement to obtain a tungsten carbide/carbon nanotube/platinum (WC/CNT/Pt) composite material.

In the invention, the solution of a mixture of ammonium metatungstate and ferric nitrate may be formulated according to the following procedure: mixing ammonium metatungstate and ferric nitrate at a mass ratio of 1:0.3-1.3, and adding deionized water to formulate a 5-50 wt % solution, wherein the mass ratio of ammonium metatungstate and ferric nitrate for mixing is preferably 1:0.8-1.2, and the total mass fraction of ammonium metatungstate and ferric nitrate in the solution of a mixture of ammonium metatungstate and ferric nitrate is preferably 5-20 wt %. According to the invention, the formulated solution of a mixture of ammonium metatungstate and ferric nitrate is preferably dispersed sufficiently by ultrasonication before spray drying, such that the components of the mixture in the particles are distributed evenly after spray drying. Appropriately prolonged ultrasonication facilitates formation of a solution of a mixture which is dispersed more evenly, but the time is most preferably not more than 15 minutes. Hence, the ultrasonication time is generally 1-15 minutes, preferably 3-5 minutes.

In the invention, the solution of a mixture of ammonium metatungstate and ferric nitrate is pelletized by spray drying process, wherein a double gas flow spray dryer is used for spray drying, and the inlet temperature of the spray dryer may be set at 150-230° C., preferably 180-200° C.

In the invention, in order to prevent the particles obtained by spray drying from becoming damp, they may be placed in a desiccator or calcined for later use. The conditions for calcination may be calcination at 500-700° C. for 1-5 hours.

In the invention, the particles are carbonized by temperature programmed gas-solid reaction process to obtain a WC/CNT/Fe composite material. The carbonization step is carried out in a hydrogen rich atmosphere in a high temperature tubular reaction furnace, wherein the hydrogen rich atmosphere refers to a mixed atmosphere comprising more than 50% $H_2$. Carbonization in a hydrogen rich atmosphere can perfectly maintain the macroscopic morphology of the precursor after modification by spray drying, and the volatile components in the reaction particles can be removed gradually in certain temperature programmed process, such that the probability of collision and coagulation between particles is reduced, and a WC material having good dispersity and developed porosity is obtained. According to the invention, the hydrogen rich atmosphere is preferably a mixed atmosphere of CO and $H_2$ at a ratio by volume of 1: 1.1-2.5. The temperature programmed gas-solid reaction process is preferably conducted by increasing the temperature to 750-900° C. at a rate of 1-10° C./min under program control and holding for 2-8 hours, more preferably by increasing the temperature to 780-850° C. at a rate of 3-7° C./min under program control and holding for 3-6 hours. After carbonization and cooling, a WC/CNT/Fe composite material is obtained. In the invention, CNT is generated concurrently with the step of carbonization, and facilitates the dispersion of WC and Fe nanoparticles.

In the invention, the WC/CNT/Fe composite material may be loaded with platinum by platinum displacement in a solution, and such steps as high temperature gas reduction, reductant reduction and the like which are necessary for conventional platinum loading may be exempted, such that raw materials and energy are saved. According to the invention, the solution of a platinum containing compound is preferably a chloroplatinic acid solution having a concentration of 1-20 mmol/L, and the amount of the platinum containing compound used is 5%-30% of the mass of the tungsten carbide/carbon nanotube/iron composite material based on the mass of Pt. Specifically, the platinum displacement is carried out by placing the tungsten carbide/carbon nanotube/iron composite material in the solution of a platinum containing compound at room temperature to 70° C. for 2-12 hours. The displacement temperature is preferably room temperature to 50° C., and the displacement time is preferably 3-12 hours.

The invention provides a use of the WC/CNT/Pt composite material as an electrocatalyst in a methanol fuel cell. Results show that the WC/CNT/Pt composite catalyst can improve the catalytic conversion efficiency and the service life of the catalyst significantly.

In addition, the invention provides a tungsten carbide/carbon nanotube (WC/CNT) composite material which comprises mesoporous spherical tungsten carbide of 1-5 microns in diameter and carbon nanotubes, wherein the carbon nanotubes grow on the surface of the mesoporous spherical tungsten carbide and extend outwardly therefrom.

Meanwhile, the invention provides a method for preparing the tungsten carbide/carbon nanotube (WC/CNT) composite material, comprising the following steps:

(a) pelletizing a solution of a mixture of ammonium metatungstate and ferric nitrate by spray drying; carbonizing the resulting particles directly or after calcination by temperature programmed gas-solid reaction process to obtain a tungsten carbide/carbon nanotube/iron composite material after completion of the carbonization;

(b) treating the tungsten carbide/carbon nanotube/iron composite material with an acid to obtain a tungsten carbide/carbon nanotube composite material.

Said step (a) is the same as abovementioned step (1), the description of which will be repeated no more.

In said step (b), the specific steps utilized in the acid treatment include: placing WC/CNT/Fe in the acid, magnetically stirring at room temperature for certain time, washing several times, and drying to obtain a WC/CNT composite material. According to the invention, the acid is preferably hydrochloric acid, e.g. 10% hydrochloric acid; and the stirring time is 0.1-1 hour, preferably 0.5 hour.

The invention also provides a use of the WC/CNT composite material as an electrocatalyst in the electro-reduction reaction of aromatic nitro compounds, wherein the aromatic nitro compounds may be nitrobenzene, nitromethane, nitronaphthene, m-dinitrobenzene, etc. Results show that the WC/CNT composite material can improve the efficiency of organic electrosynthesis significantly.

Compared with existing Pt nanocrystalline catalysts(Pt/WC, Pt/CNT), the invention has the following outstanding advantages:

1. The WC/CNT and WC/CNT/Pt composite catalysts not only have high catalytic activity and good thermal stability, but also exhibit stable bonding between components due to the use of non-conventional loading.

2. The WC/CNT/Pt composite catalyst contains WC, such that the stability of the catalyst is improved and its anti-poisoning ability is enhanced.

3. CNT in the WC/CNT and WC/CNT/Pt composite catalysts is generated concurrently with the step of carbonization, and grows on the WC spheres, leading to stable bonding and simplified procedure.

4. Pt particles in the WC/CNT/Pt composite catalyst are obtained by displacement of Fe particles, which exempts a number of steps in a conventional method for loading Pt and consumption of raw materials such as reductant, simplifies the procedure, and lowers the cost effectively.

5. The load of Pt on the WC/CNT/Pt composite catalyst may be controlled by the Fe content in the precursor solution and the amount of later addition of the chloroplatinic acid solution.

6. The WC/CNT/Pt and WC/CNT composite materials may be used widely as electrocatalysts in such important

BRIEF DESCRIPTION OF THE DRAWINGS

In FIG. 5, the abscissa represents the electric potential of the work electrode/V (SCE, with saturated calomel electrode as the reference electrode), the ordinate represents the mass current of platinum/(mA/mg Pt), and the curves represent WC/CNT/Pt and carbon supported platinum nanocrystalline catalyst (containing 40 wt % platinum) available from China Hesen Co. respectively. In the measurement, the solution is an aqueous solution of a mixture of methanol (2M) and sulfuric acid (1M), and the scanning speed is 50 mV/s.

In FIG. 6, the abscissa represents time (S), and the ordinate represents mass current/(mA·mg$^{-1}$). The curves represent WC/CNT/Pt and carbon supported platinum nanocrystalline catalyst (containing 40 wt % platinum) available from China Hesen Co. respectively. In the measurement, the solution is an aqueous solution of a mixture of methanol (2M) and sulfuric acid (1M), the scanning speed is 50 mV/s, and the electrode potential is set to be 0.65V.

In FIG. 8, the abscissa represents the electric potential of the work electrode/V (SCE, with saturated calomel electrode as the reference electrode), the ordinate represents current/µA, and the curves represent WC/CNT and nano WC catalyst [a sample obtained according to Example 1 of a patent (ZL 101698511B, A Sheet-like Nano Ammonium Metatungstate and Use Thereof)] respectively. In the measurement, the solution is an aqueous solution of a mixture of nitrobenzene (0.03M) and tetrabutylammonium perchlorate (TBAP) (0.1M), and the scanning speed is 50 mV/s.

DETAILED DESCRIPTION OF THE INVENTION

The following examples will further illustrate the invention with reference to the accompanying drawings, but the protection scope of the invention is not limited thereto.

Example 1

30 g ammonium metatungstate and 27 g ferric nitrate were dissolved in 250 mL deionized water, agitated by ultrasonication for 5 minutes, and spray dried using a double gas flow spray dryer (inlet temperature: 200° C.) to obtain solid particles which were then placed in a desiccator for later use. A portion of the particles were calcined at 600° C. for 2 hours. The calcined sample was placed in a tubular furnace where the sample was carbonized in a mixed atmosphere of CO:H$_2$ (125:250 mL/min) by increasing the temperature to 800° C. at a rate of 6° C./min under program control and holding for 4 hours to obtain a WC/CNT/Fe sample. To the WC/CNT/Fe sample was added 5 mmol/L chloroplatinic acid solution in an amount equivalent to addition of 10 wt % platinum. After standing at a constant temperature of 50° C. for 5 hours, the sample was filtered, washed and dried to obtain a WC/CNT/Pt sample having a mesoporous structure.

Figure 1:
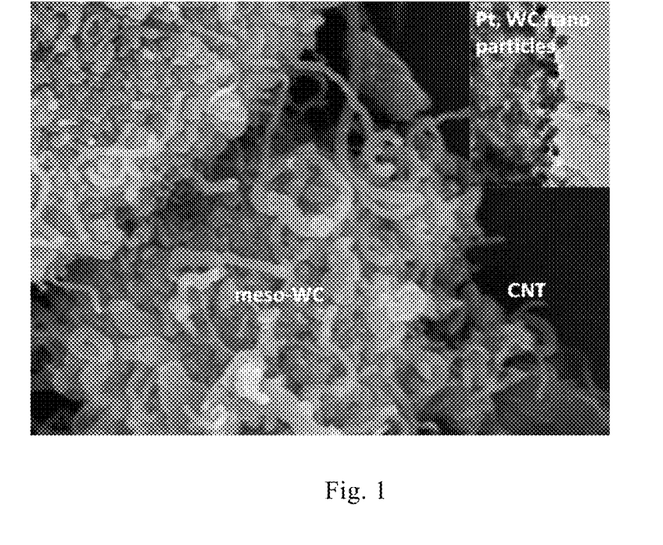
FIG. 1 shows a scanning electron microscopy (SEM) image and an inlaid transmission election microscopy (TEM) image of a WC/CNT/Pt composite material prepared according to Example 1 of the invention.
Figure 2:
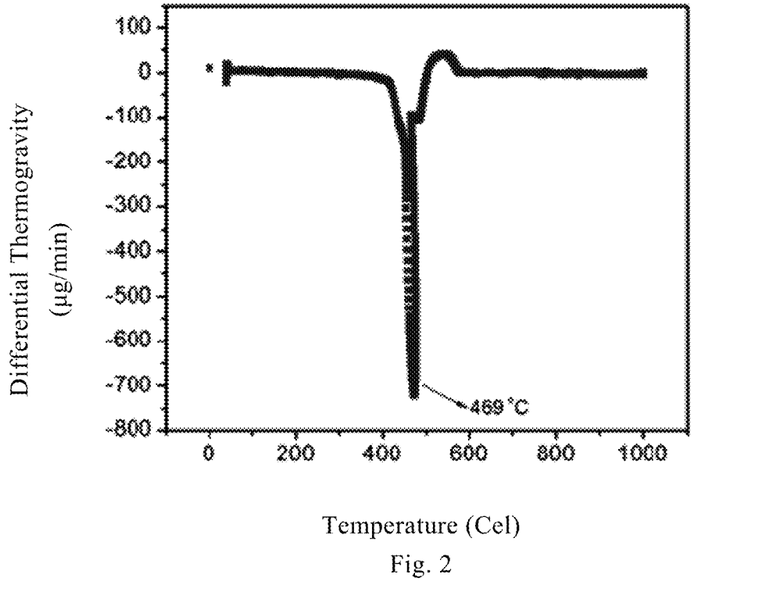
FIG. 2 shows a DTG (differential thermogravimetry) test graph of a WC/CNT/Pt composite material prepared according to Example 1 of the invention.

FIG. 1 shows an SEM image and an inlaid TEM image of the prepared WC/CNT/Pt catalyst. As shown by FIG. 1, a large number of CNTs grow from the surface of the mesoporous spherical WC, and 2-5 nm Pt and WC particles can be observed on the surface of CNT. FIG. 2 shows a DTG (differential thermogravimetry) of the sample in air, indicating good thermal stability of the sample at a temperature as high as 400° C. in air atmosphere.

Example 2

This example is similar to the procedure of Example 1 except that 9 g ferric nitrate was added, and the remaining steps are the same. A WC/CNT/Pt sample was obtained.

Figure 3:
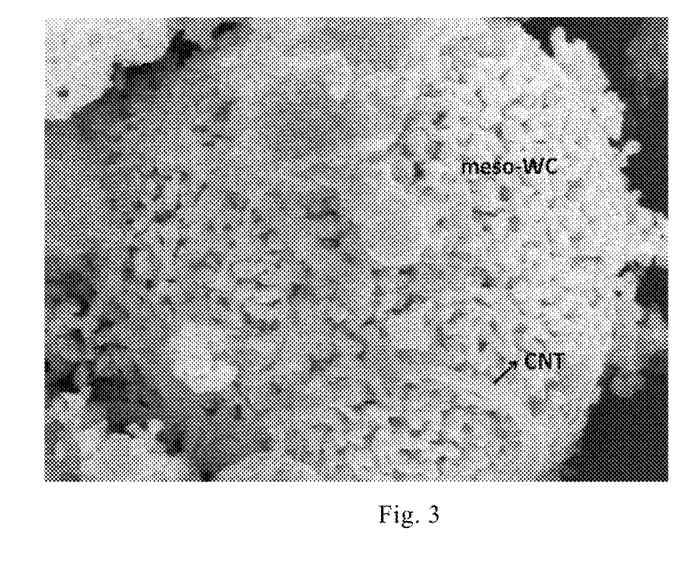
FIG. 3 shows a scanning electron microscopy (SEM) image of a WC/CNT/Pt composite material prepared according to Example 2 of the invention.

FIG. 3 shows an SEM image of the prepared WC/CNT/Pt catalyst. As shown by FIG. 3, the presence of mesoporous spherical WC and a small amount of CNTs in the sample can be observed. Due to reduced Fe content, CNTs catalytically grown on the surface of the spherical WC are reduced, while the mesoporous structure of the spherical surface appears.

Example 3

This example is similar to the procedure of Example 1 except that 36 g ferric nitrate was added, and the remaining steps are the same. A WC/CNT/Pt sample was obtained.

Figure 4:
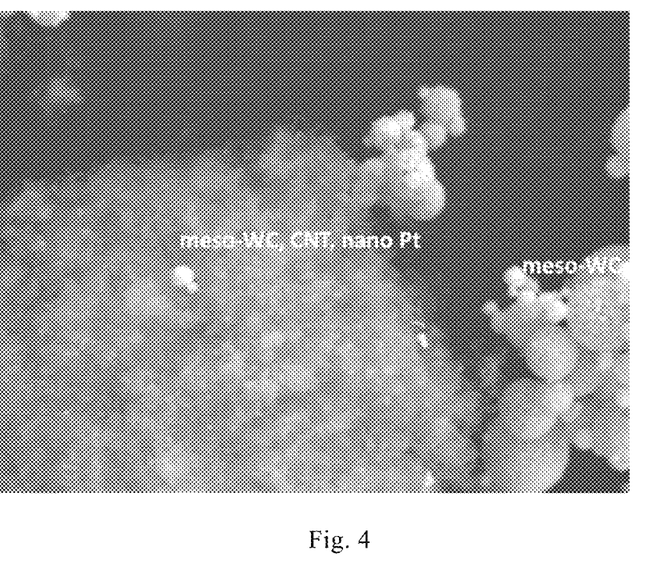
FIG. 4 shows a scanning electron microscopy (SEM) image of a WC/CNT/Pt composite material prepared according to Example 3 of the invention.

FIG. 4 shows an SEM image of the prepared WC/CNT/Pt catalyst. As shown by FIG. 4, the presence of WC and a large amount of CNTs in the sample can be observed.

Figure 5:
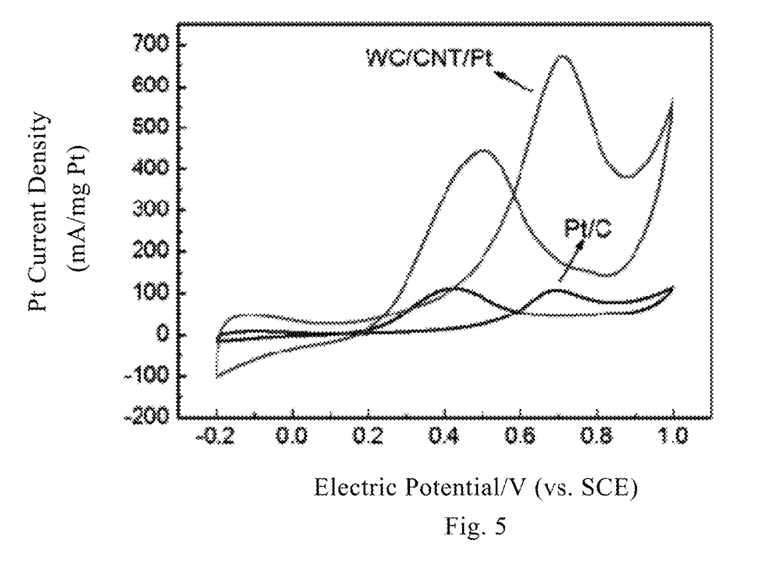
FIG. 5 shows a characterization graph of the catalytic activity of a WC/CNT/Pt composite material prepared according to Example 3 of the invention for methanol.

FIG. 5 shows a characterization graph of the catalytic activity of the WC/CNT/Pt catalyst for methanol, indicating that the catalytic activity per unit mass of platinum is apparently higher than that of the commercial Pt nanocrystalline catalyst (platinum load: 40 wt %) from Hesen Co.

Figure 6:
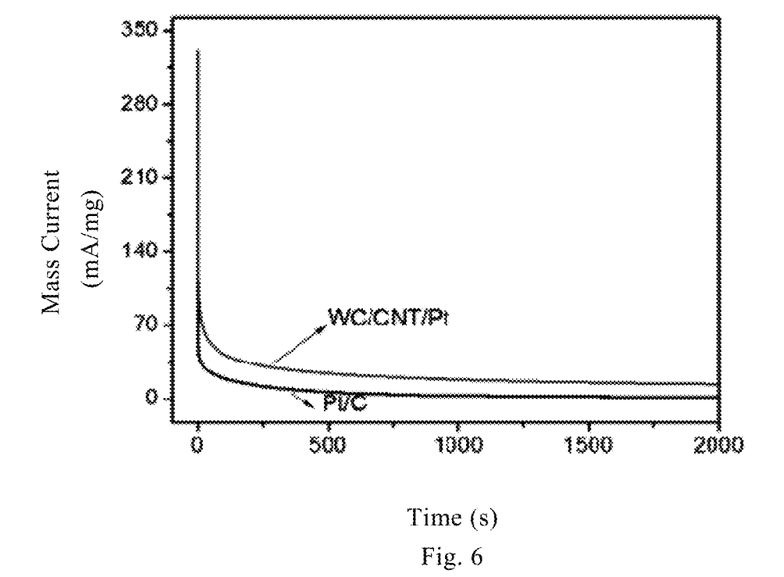
FIG. 6 shows a characterization graph of the catalytic activity of a WC/CNT/Pt composite material prepared according to Example 3 of the invention for methanol.

In addition, FIG. 6 shows a CA characterization graph of the catalytic activity of the WC/CNT/Pt catalyst for methanol. After the current is stable, WC/CNT/Pt exhibits better activity, indicating better stability.

Example 4

This example is similar to the procedure of Example 3 except that the sample was allowed to stand still in the chloroplatinic acid solution only at room temperature (20° C.) and the treatment time was 12 hours, and the remaining steps are the same. A WC/CNT/Pt sample was obtained.

Example 5

This example is similar to the procedure of Example 1 except that the step of carbonizing the sample was conducted immediately after the completion of the spray drying step, and the remaining steps are the same. A WC/CNT/Pt sample was obtained.

Example 6

Figure 7:
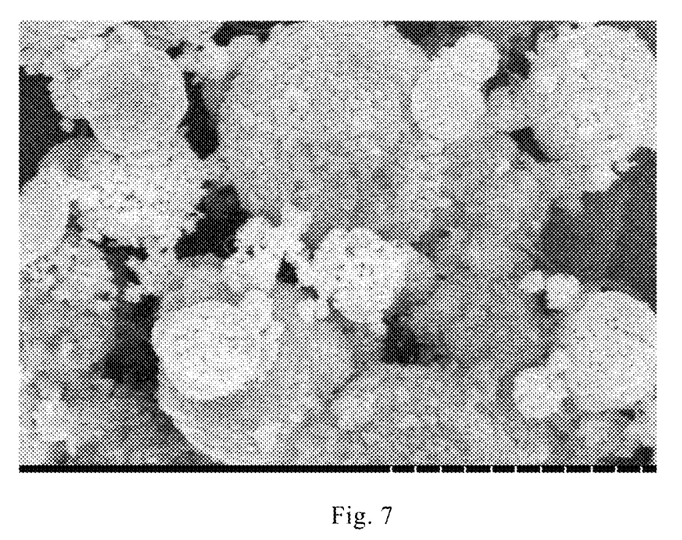
FIG. 7 shows an SEM morphology image of a WC/CNT sample according to Example 6.
Figure 8:
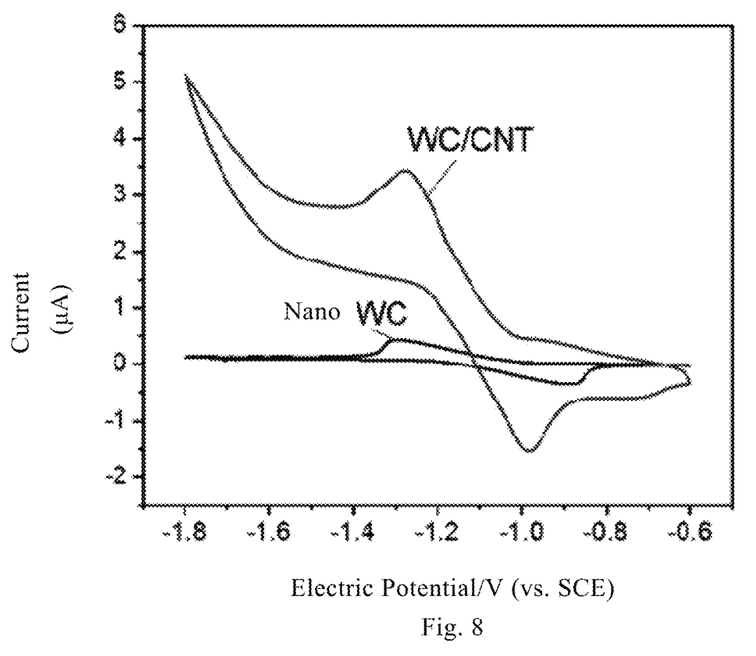
FIG. 8 shows a characterization graph of the catalytic activity of WC/CNT prepared according to Example 6 of the invention for nitro reduction.

This example is similar to the procedure of Example 1 except that after the WC/CNT/Fe sample was obtained, Fe was removed using 10% hydrochloric acid solution to obtain a WC/CNT sample whose morphology is shown by FIG. 7, and Pt displacement was exempted. This sample was subjected to performance assessment for nitro reduction reaction, an important reaction in electrosynthesis. As shown by FIG. 8, its electrocatalytic activity is apparently higher than that of nano WC.

Example 7

This example is similar to the procedure of Example 1 except that the precursors, ammonium metatungstate and ferric nitrate, were dissolved in 1250 mL deionized water, and the remaining steps are the same. A WC/CNT/Pt sample was obtained.

Example 8

This example is similar to the procedure of Example 1 except that the inlet temperature for spray drying the solution of the mixture was 180° C., and the remaining steps are the same. A WC/CNT/Pt sample was obtained.

Example 9

This example is similar to the procedure of Example 1 except that 20 mmol/L chloroplatinic acid solution was added and corresponded to 30% of the theoretical load of platinum, and the remaining steps are the same. A WC/CNT/Pt sample was obtained.

Example 10

This example is similar to the procedure of Example 1 except that 1 mmol/L chloroplatinic acid solution was added and corresponded to 1% of the theoretical load of platinum, and the remaining steps are the same. A WC/CNT/Fe/Pt sample was obtained.

The invention claimed is:

1. A tungsten carbide/carbon nanotube/platinum composite material, wherein the tungsten carbide/carbon nanotube/platinum composite material comprises mesoporous spherical tungsten carbide of 1-5 microns in diameter, carbon nanotubes and platinum nanoparticles, wherein the carbon nanotubes grow on the surface of the mesoporous spherical tungsten carbide and extend outwardly therefrom, and the platinum nanoparticles grow on the surfaces of the mesoporous spherical tungsten carbide and the carbon nanotubes.

2. A method for preparing the tungsten carbide/carbon nanotube/platinum composite material of claim 1, wherein the method comprises the following steps:
(1) pelletizing a solution of a mixture of ammonium metatungstate and ferric nitrate by spray drying; carbonizing the resulting particles by temperature programmed gas-solid reaction process directly or after calcination to obtain a tungsten carbide/carbon nanotube/iron composite material after completion of the carbonization;
(2) putting the tungsten carbide/carbon nanotube/iron composite material into a solution of a platinum containing compound to carry out platinum displacement to obtain the tungsten carbide/carbon nanotube/platinum composite material.

3. The method of claim 2 for preparing the tungsten carbide/carbon nanotube/platinum composite material, wherein the solution of a mixture of ammonium metatungstate and ferric nitrate is formulated according to the following procedure: mixing ammonium metatungstate and ferric nitrate at a mass ratio of 1:0.3~1.3, and adding deionized water to formulate a 5-50 wt % solution.

4. The method of claim 2 for preparing the tungsten carbide/carbon nanotube/platinum composite material, wherein the carbonization of step (1) is carried out in a hydrogen rich atmosphere having a volume fraction of hydrogen of more than 50%.

5. The method of claim 4 for preparing the tungsten carbide/carbon nanotube/platinum composite material, wherein the hydrogen rich atmosphere is a mixed atmosphere of CO and $H_2$ at a ratio by volume of 1:1.1-2.5.

6. The method of any one of claims 2-5 for preparing the tungsten carbide/carbon nanotube/platinum composite material, wherein the temperature programmed gas-solid reaction process is conducted by increasing the temperature of the particles to 750-900° C. at a heating rate of 1-10° C./min directly or after calcination, then holding for 2-8 hours.

7. The method of claim 2 for preparing the tungsten carbide/carbon nanotube/platinum composite material, wherein the solution of a platinum containing compound is a chloroplatinic acid solution having a concentration of 1-20 mmol/L, and the amount of the platinum containing compound used is 5%-30% of the mass of the tungsten carbide/carbon nanotube/iron composite material based on the mass of Pt.

8. The method of claim 7 for preparing the tungsten carbide/carbon nanotube/platinum composite material, wherein the platinum displacement is carried out under a temperature of room temperature to 70° C. and at a displacement time of 2-12 hours.

9. A method of using the tungsten carbide/carbon nanotube/platinum composite material of claim 1, comprising providing the material as an electrocatalyst in a methanol fuel cell.

10. A tungsten carbide/carbon nanotube composite material, wherein the tungsten carbide/carbon nanotube composite material comprises mesoporous spherical tungsten carbide of 1-5 microns in diameter and carbon nanotubes, and the carbon nanotubes grow on the surface of the mesoporous spherical tungsten carbide and extend outwardly therefrom.

11. A method for preparing the tungsten carbide/carbon nanotube composite material of claim 10, wherein the method comprises the following steps:
(a) pelletizing a solution of a mixture of ammonium metatungstate and ferric nitrate by spray drying; carbonizing the resulting particles by temperature programmed gas-solid reaction process directly or after calcination to obtain a tungsten carbide/carbon nanotube/iron composite material after completion of the carbonization;
(b) treating the tungsten carbide/carbon nanotube/iron composite material with an acid to obtain the tungsten carbide/carbon nanotube composite material.

12. The method of claim 11 for preparing the tungsten carbide/carbon nanotube composite material, wherein the solution of a mixture of ammonium metatungstate and ferric nitrate is formulated according to the following procedure: mixing ammonium metatungstate and ferric nitrate at a mass ratio of 1:0.3~1.3, and adding deionized water to formulate a 5-50 wt % solution; the carbonization of step (a) is carried out in a hydrogen rich atmosphere having a volume fraction of hydrogen of more than 50%; and the temperature programmed gas-solid reaction process is specifically conducted by increasing the temperature of the particles to 750-900° C. at a heating rate of 1-10° C./min directly or after calcination and holding for 2-8 hours.

13. The method of claim 11 for preparing the tungsten carbide/carbon nanotube composite material, wherein a hydrochloric acid solution is used in the acid treatment of step (b).

14. A method of using the tungsten carbide/carbon nanotube composite material of claim 10, comprising providing the material as an electrocatalyst in the electro-reduction reaction of aromatic nitro compounds.

* * * * *